United States Patent
Li et al.

(10) Patent No.: US 12,512,663 B2
(45) Date of Patent: Dec. 30, 2025

(54) GROUND FAULT CIRCUIT INTERRUPTER DEVICES AND RELATED ELECTRICAL CONNECTORS AND ELECTRICAL APPLIANCES

(71) Applicant: Chengli Li, Suzhou (CN)

(72) Inventors: Chengli Li, Suzhou (CN); Long Chen, Suzhou (CN); Guolan Yue, Suzhou (CN)

(73) Assignee: Chengli Li, Suzhou (CN)

( * ) Notice: Subject to any disclaimer, the term of this patent is extended or adjusted under 35 U.S.C. 154(b) by 181 days.

(21) Appl. No.: 18/537,176

(22) Filed: Dec. 12, 2023

(65) Prior Publication Data
US 2025/0141207 A1    May 1, 2025

Related U.S. Application Data

(63) Continuation-in-part of application No. 18/505,031, filed on Nov. 8, 2023.

(30) Foreign Application Priority Data

Oct. 26, 2023  (CN) .......................... 202311398460.X
Oct. 26, 2023  (CN) .......................... 202322882497.1

(51) Int. Cl.
   *H02H 3/16* (2006.01)
(52) U.S. Cl.
   CPC .................................. *H02H 3/162* (2013.01)
(58) Field of Classification Search
   CPC .......... H02H 3/16; H02H 3/025; H02H 3/335; H02H 3/162; H02H 3/331; H02H 3/05; G01R 31/52; G01R 31/58
   USPC ....................................................... 361/42–50
   See application file for complete search history.

(56) References Cited

U.S. PATENT DOCUMENTS

| | | | | |
|---|---|---|---|---|
| 3,953,766 A * | 4/1976 | Howell | ................. | H02H 3/027 361/45 |
| 3,959,693 A * | 5/1976 | Coley | .................... | H02H 3/331 361/45 |
| 4,428,019 A * | 1/1984 | Howell | .................... | H02H 3/33 361/45 |
| 7,345,489 B2 * | 3/2008 | DeHaven | ............. | H02H 1/0015 324/555 |
| 2004/0037018 A1 * | 2/2004 | Kim | ....................... | H02H 3/338 361/42 |

(Continued)

*Primary Examiner* — Danny Nguyen
(74) *Attorney, Agent, or Firm* — Chen Yoshimura LLP

(57) ABSTRACT

A ground fault circuit interrupter (GFCI) device includes a ground fault detection module for detecting a ground fault in a neutral line of a plurality of current carrying lines and generating a ground fault signal in response thereto, including a neutral line detection coil having a magnetic core made of a silicon steel and through which the current carrying lines pass; a leakage current detection module for detecting the ground fault signal and detecting a leakage current signal on the current carrying lines, and generating a zero sequence current fault signal in response to either signal; and a drive module for receiving the zero sequence current fault signal and driving a switch module to disconnect the electrical connection of the current carrying lines in response thereto. The GFCI device can avoid false tripping when high frequency currents flow through the current carrying lines, improving user experience and enhancing safety.

12 Claims, 9 Drawing Sheets

(56) References Cited

U.S. PATENT DOCUMENTS

| | | | |
|---|---|---|---|
| 2008/0232007 A1* | 9/2008 | Musat | G01R 31/52 361/45 |
| 2017/0025846 A1* | 1/2017 | Du | H02H 3/335 |
| 2021/0265832 A1* | 8/2021 | Li | H02H 3/335 |
| 2023/0184848 A1* | 6/2023 | Nagawaram | G01R 31/52 324/509 |

* cited by examiner

GROUND FAULT CIRCUIT INTERRUPTER DEVICES AND RELATED ELECTRICAL CONNECTORS AND ELECTRICAL APPLIANCES

BACKGROUND OF THE INVENTION

This invention relates to electrical circuits, and in particular, it relates to ground fault circuit interrupters and related electrical connectors and electrical appliances.

With increased use of electrical appliances and safety awareness, more and more electrical appliances are equipped with ground fault circuit interrupters (GFCI). The types of home appliances on the market today are numerous, and their internal circuits are increasingly complex. When various different types of electrical appliances are connected to the same power supply lines, currents of different frequencies may be generated on the power supply lines. Conventional GFCI devices typically use detection coils where the magnetic cores are made of ferrites, and the detection coils are coupled to a detection chip to detect the ground fault. However, when relatively high frequency currents flow through the power supply lines, this type of detection coil and circuit connection often erroneously treat high frequency currents as zero sequence current, causing false tripping. This adversely affects user experience, and can lead to hidden safety threats and cause dangerous conditions.

SUMMARY OF THE INVENTION

To solve the above problems, in a first aspect, the present invention provides a ground fault circuit interrupter device, which includes: a switch module, coupled on a plurality of current carrying lines between an input end and an output end, configured to connect or disconnect an electrical connection between the input end and the output end, wherein the plurality of current carrying lines includes a neutral line; a ground fault detection module, including at least one neutral line detection coil through which the plurality of current carrying lines pass, wherein the at least one neutral line detection coil has a magnetic core made of a silicon steel material, and wherein the ground fault detection module is configured to detect a ground fault in the neutral line and to generate a ground fault signal in response thereto, wherein when a simulated grounding resistance of the neutral line Rt is 2 ohms, a peak value of a voltage waveform generated by the ground fault signal on the simulated grounding resistance is greater than or equal to 16 mV; a leakage current detection module, coupled to the current carrying lines, configured to detect the ground fault signal and to detect a leakage current signal on the current carrying lines, and to generate a zero sequence current fault signal in response to detecting the ground fault signal and/or the leakage current signal; and a drive module, coupled to the switch module and the leakage current detection module, configured to receive the zero sequence current fault signal, and to drive the switch module to disconnect the electrical connection in response to the zero sequence current fault signal.

In some embodiments, the ground fault detection module includes at least one current limiting element, coupled in series with the at least one neutral line detection coil and coupled to the current carrying lines, configured to generate an alternating current on the at least one neutral line detection coil which in turn generates an alternative magnetic field, wherein when the neutral line has a ground fault, under actions of the alternating magnetic field, the ground fault signal is generated on the neutral line.

In some embodiments, the at least one current limiting element is one or more of a resistor, a capacitor, or an inductor.

In some embodiments, the at least one neutral line detection coil is coupled to the plurality of current carrying lines via a rectifier module.

In some embodiments, the magnetic core of the at least one neutral line detection coil is formed of a wound silicon steel band, or a stack of multiple silicon steel plates.

In some embodiments, a winding of the at least one neutral line detection coil has at least 500 turns.

In some embodiments, the device further includes a self-test module coupled to the leakage current detection module and the drive module, configured to periodically generate a simulated leakage current signal to detect whether the leakage current detection module and/or the drive module is malfunctioning, and when the leakage current detection module and/or the drive module malfunctions, to generate a self-test fault signal.

In some embodiments, the self-test module includes a voltage-triggered sub-module and a first capacitor coupled in series, wherein the first capacitor is charged by the plurality of current carrying lines and configured to periodically generate the simulated leakage current signal via the voltage-triggered sub-module.

In some embodiments, the voltage-triggered sub-module includes a trigger diode, a transistor, a field-effect transistor, and/or a comparator.

In some embodiments, the device further includes a monitor module, coupled to the leakage current detection module and includes a test switch, wherein the monitor module is configured to generate a simulated leakage current signal in response to the test switch being operated, to detect whether the ground fault circuit interrupter device is functioning normally.

In a second aspect, the present invention provides an electrical power connection device, which includes: a body; and a ground fault circuit interrupter device according to any of the above embodiments, disposed inside the body.

In a third aspect, the present invention provides an electrical appliance, which includes: an electrical load; and an electrical power connection device coupled between a power supply and the electrical load, configured to supply power to the electrical load, wherein the electrical power connection device includes a ground fault circuit interrupter device according to any of the above embodiments.

In embodiments of the present invention, by using a neutral line detection coil where the magnetic core is made of a silicon steel material, and using a different connection circuit, the GFCI device can disconnect the power connection when the neutral line has a ground fault, to realize ground fault detection and protection functions, while avoiding false tripping when high frequency currents flow through the power supply lines. This improves user experience, and eliminates hidden safety threats, improving the safety of the GFCI device. Moreover, the device has a simple structure, is low cost and safe.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale.

In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF THE INVENTION

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Before describing the embodiments, some terms used in this disclosure are defined here to help the reader better understand this disclosure.

In this disclosure, terms such as "connect", "couple", "link" etc. should be understood broadly, without limitation to physical connection or mechanical connection, but can include electrical connection, and can include direct or indirection connections. Terms such as "a" and "one" do not limit the quantity, and refers to "at least one".

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc. In this disclosure, the above terms do not necessarily refer to the same embodiments. Further, the various features, structures, materials or characteristics may be suitably combined in any of the one or more embodiments. Those of ordinary skill in the art may combine the various embodiments and various characteristics of the embodiments described herein when they are not contrary to each other.

Embodiments of the present invention provide a GFCI device. By using a neutral line detection coil where the magnetic core is made of a silicon steel material, and using a different connection circuit, the GFCI device can disconnect the power connection when the neutral line has a ground fault, to realize ground fault detection and protection functions, while avoiding false tripping when high frequency currents flow through the power supply lines. This improves user experience, and eliminates hidden safety threat, improving the safety of the GFCI device. Moreover, the device has a simple structure, is low cost and safe.

Figure 1:
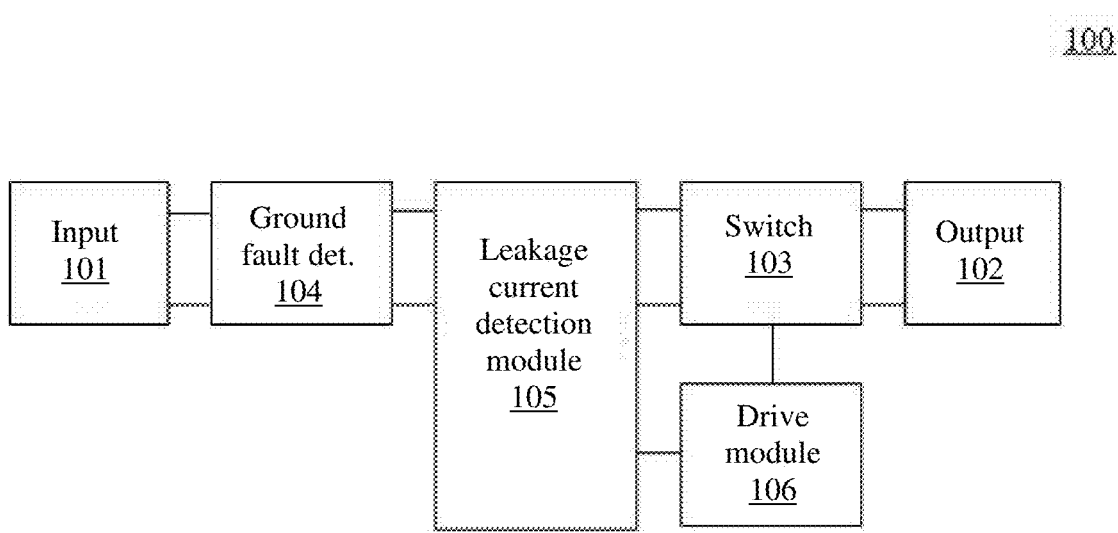
FIG. 1 is a block diagram illustrating a ground fault circuit interrupter device according to embodiments of the present invention.

FIG. 1 is a block diagram illustrating a ground fault circuit interrupter device according to embodiments of the present invention. As shown in FIG. 1, the GFCI device 100 includes a switch module 103, a ground fault detection module 104, a leakage current detection module 105, and a drive module 106. The switch module 103 is coupled between the input end 101 and output end 102 of the power supply lines, and controls the electrical connection and disconnection between the input and output ends. The power supply lines may include a first current carrying line (HOT) coupled to the hot line of the power source, and a second current carrying line (WHITE) coupled to the neutral line of the power source. I.e., the first current carrying line is the hot line and the second current carrying line is the neutral line. The ground fault detection module 104 includes at least one neutral line detection coil through which the current carrying lines pass. The at least one neutral line detection coil has a magnetic core made of silicon steel. The ground fault detection module 104 functions to detect whether the neutral line has a ground fault, and generates a ground fault signal when detecting a ground fault. The leakage current detection module 105 functions to detect the ground fault signal and to detect a leakage current signal on the current carrying lines, and to generate a zero sequence current fault signal in response the ground fault signal and/or the leakage current signal. The drive module 106 is coupled to the switch module 103 and the leakage current detection module 105, and functions to receive the zero sequence current fault signal, and to drive the switch module 103 to disconnect the power in response to the zero sequence current fault signal.

In some embodiments, the ground fault detection module 104 includes at least one current limiting element, coupled in series with the neutral line detection coil and coupled to the current carrying line, so as to generate an alternating current on the at least one neutral line detection coil which in turn generates an alternative magnetic field. When the neutral line has a ground fault, under the action of the alternating magnetic field, the ground fault signal is generated on the neutral line. The ground fault signal may be, for example, a simulated alternating current. The at least one current limiting element may be any one of a resistor, capacitor, inductor, or combination thereof.

In some embodiments, the at least one neutral detection coil is coupled to the current carrying lines via a rectifier module. The rectifier module may be, for example, a rectifying diode or a rectifier bridge. Coupling the neutral detection coil to the current carrying lines via the rectifier module can further improve the safety of the GFCI device 100.

In some embodiments, the magnetic core of the at least one neutral line detection coil is formed of a wound silicon steel band, or a stack of multiple silicon steel plates.

In some embodiments, the winding of the at least one neutral line detection coil has at least 500 turns.

In some embodiments, the GFCI device further includes a self-test module. The self-test module is coupled to the leakage current detection module 105 and the drive module 106; it functions to periodically generate a simulated leakage current signal to detect whether the leakage current detection module 105 and/or drive module 106 is malfunctioning, and when the leakage current detection module 105 and/or the drive module 106 malfunctions, to generate a self-test fault signal.

In some embodiments, the self-test module includes a voltage-triggered sub-module and a first capacitor coupled in series, wherein the first capacitor is charged by the current carrying lines and configured to periodically generate the simulated leakage current signal via the voltage-triggered sub-module. The voltage-triggered sub-module may include a trigger diode, transistor, field-effect transistor, and/or comparator.

In some embodiments, the GFCI device 100 further includes a monitor module, coupled to the leakage current detection module 105, wherein the monitor module includes a test switch and is configured to generate a simulated leakage current signal in response to the test switch being operated, to detect whether the GFCI device 100 is functioning normally.

Figure 2:
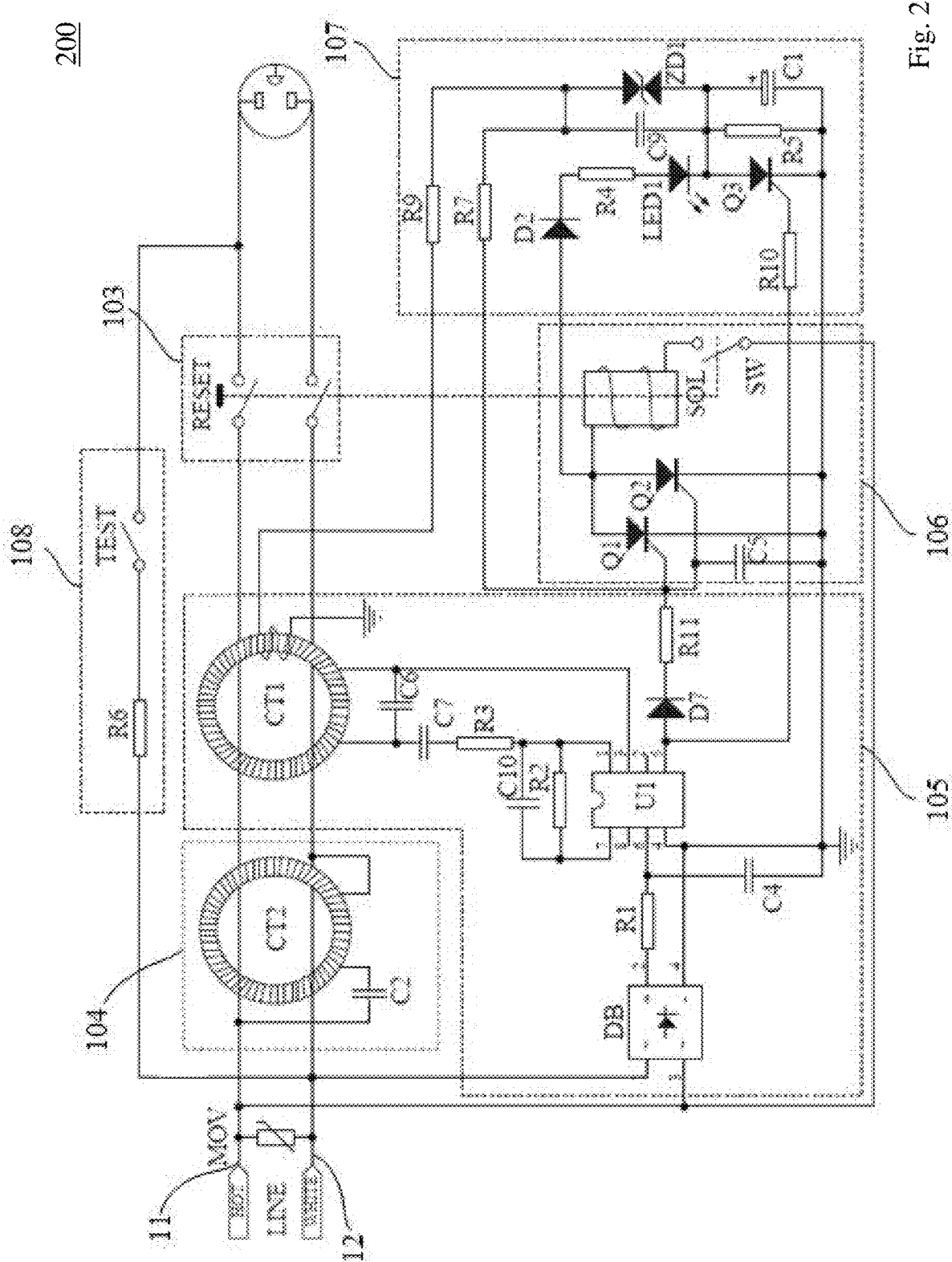
FIG. 2 is a circuit diagram of a ground fault circuit interrupter device according to a first embodiment of the present invention.

FIG. 2 is a circuit diagram of a leakage current detection and interruption device according to a first embodiment of the present invention.

As shown in FIG. 2, the GFCI device 200 is coupled between the input end LINE and a load, and includes a switch module 103, a ground fault detection module 104, a leakage current detection module 105, a drive module 106, a self-test module 107, and a monitor module 108. The power supply lines may include a first current carrying line (HOT) 11 and a second current carrying line (WHITE) 12, i.e., the first current carrying line 11 is the hot line and the second current carrying line 12 is the neutral line.

The switch module 103 includes a reset switch RESET, which functions to control the electrical connection of the current carrying lines. The ground fault detection module 104 includes a neutral line detection coil CT2 and a capacitor C2 coupled in series, where the first current carrying line 11 and the second current carrying line 12 pass through neutral line detection coil CT2. Neutral line detection coil CT2 has a magnetic core made of silicon steel. More specifically, the magnetic core is formed of a wound silicon steel band, or a stack of multiple silicon steel plates. The winding of the neutral line detection coil CT2 has at least 500 turns. The neutral line detection coil CT2 is coupled at one end to the first current carrying line 11 via capacitor C2, and coupled at the other end to the second current carrying line 12. The leakage current detection module 105 includes a zero sequence current transformer CT1, a leakage current detection chip U1 and its peripheral circuits, where the first current carrying line 11 and the second current carrying line 12 pass through zero sequence current transformer CT1. The drive module 106 includes a switch driving element (e.g. a solenoid SOL), two silicon controlled rectifiers Q1 and Q2, and auxiliary switch SW. The auxiliary switch SW is mechanically linked to the reset switch RESET so they open and close together. The self-test module 107 includes a trigger diode ZD1 (voltage triggered sub-module), capacitor C1 (first capacitor), silicon controlled rectifier Q3, resistors R7 and R9, capacitor C9, light emitting diode LED1 coupled in parallel with resistor R7 and capacitor C9 and in series with capacitor C1, and peripheral circuit elements. In some other embodiments, the silicon controlled rectifier Q3 may be omitted, and the self-test module 107 shares silicon controlled rectifier Q1 and/or Q2 with the drive module 106, i.e., the silicon controlled rectifier Q1 and/or Q2 is coupled in parallel with capacitor C1 to provide a discharge path for capacitor C1 when the silicon controlled rectifier is conductive. The monitor module 108 includes resistor R6 and test switch TEST coupled in series. In other embodiments, the voltage triggered sub-module may be a transistor, field-effect transistor, and/or comparator.

The GFCI device 200 has a neutral line ground fault protection function. When the GFCI device 200 is connected to the load and connected to the power source, a current flows through C2-CT2 and generates an alternating current on the neutral line detection coil CT2, so that the neutral line detection coil CT2 generates an alternating magnetic field. When the second current carrying line 12 (neutral line) has a ground fault, a current loop is formed from ground (the grounding point of the second current carrying line 12 at its input end) via the input end of the second current carrying line 12 (left end in FIG. 2), the output end of the second current carrying line 12 (right end in FIG. 2), equivalent impedance to ground Rg, and back to ground (the grounding point of the second current carrying line 12 at its input end). Because the second current carrying line 12 passes through the neutral line detection coil CT2, it is disposed in the alternating magnetic field, so when the second current carrying line 12 (the neutral line) has a ground fault, a simulated alternating current (the ground fault signal) is generated in the current loop from ground (the grounding point of the second current carrying line 12 at its input end)-input end of second current carrying line 12-output end of second current carrying line 12-equivalent impedance to ground Rg-ground (the grounding point of the second current carrying line 12 at its input end); i.e., the simulated alternating current flows through the second current carrying line 12.

At this time, the zero sequence current transformer CT1 detects the simulated alternating current, and generates a corresponding induction signal at its secondary winding. The zero sequence current transformer CT1 is coupled to the leakage current detection chip U1 to transfer the induction signal to the leakage current detection chip U1 for processing. When the processed leakage current signal is higher than a preset threshold, pin 5 of the leakage current detection chip U1 outputs a high voltage level (the zero sequence current fault signal); otherwise, it outputs a low voltage signal. The high voltage level at pin 5 of leakage current detection chip U1 is provided via diode D7 and resistor R11 to the control electrodes of silicon controlled rectifier Q1 and Q2, triggering silicon controlled rectifier Q1 and/or Q2 to become conductive. As a result, a current flows through the solenoid SOL, generating a sufficiently large electromagnetic force to drive the reset switch RESET of the switch module 103 to disconnect the electrical connection between the input and output ends, and to open the auxiliary switch SW at the same time.

The GFCI device 200 also has a leakage current protection function. When a leakage current is present on the first current carrying line 11 or the second current carrying line 12, the zero sequence current transformer CT1 detects the leakage current and generates a corresponding induction signal at its secondary winding. The zero sequence current transformer CT1 is coupled to the leakage current detection chip U1 to transfer the induction signal to the leakage current detection chip U1 for processing. When the processed leakage current signal is higher than a preset threshold, pin 5 of the leakage current detection chip U1 outputs a high voltage level (the zero sequence current fault signal); otherwise, it outputs a low voltage signal. The high voltage level at pin 5 is provided via diode D7 and resistor R11 to the control electrodes of silicon controlled rectifier Q1 and Q2, triggering silicon controlled rectifier Q1 and/or Q2 to become conductive. As a result, a current flows through the solenoid SOL, generating a sufficiently large electromagnetic force to drive the reset switch RESET of the switch module 103 to disconnect the electrical connection between the input and output ends, and to open the auxiliary switch SW at the same time.

The GFCI device 200 has a self-test function. A current from the first current carrying line 11 charges capacitor C1 via the current path 11-SOL-D2-R4. As the voltage across capacitor C1 rises, the voltage across the trigger diode ZD1 rises with it. After a predetermined time period, the voltage across the trigger diode ZD1 reaches its trigger voltage, triggering it to become conductive. As a result, a current flows through the path C1-ZD1-R9 to generate a simulated leakage current. The voltage on capacitor C1 also charges capacitor C5 via resistor R7.

When the GFCI device 200 functions normally, i.e., both the leakage current detection module 105 and drive module 106 function normally, when the zero sequence current transformer CT1 detects the simulated leakage current, it generates a corresponding induction signal at its secondary winding and transfers the signal to the leakage current detection chip U1, causing leakage current detection chip U1 to output a high voltage level at pin 5, triggering silicon controlled rectifier Q3 to become conductive. At this time, capacitor C1 is rapidly discharged via silicon controlled rectifier Q3, and the voltage across it drops rapidly. When the voltage drops to below the trigger voltage of the trigger diode ZD1, the trigger diode ZD1 turns off. The time period of this process is relatively short, so the voltage across capacitor C5 rises slowly during this time period, and remains relatively low, such that it is insufficient to trigger silicon controlled rectifiers Q1 and Q2 to become conductive, so as not to affect the normal function of the GFCI device 200. Therefore, during this process switch module 103 does not trip (i.e., it remains closed).

When the leakage current detection module 105 malfunctions and cannot detect the simulated leakage current, pin 5 of leakage current detection chip U1 remains at the low voltage level. Therefore, silicon controlled rectifier Q3 is not triggered to conduct, so capacitor C1 cannot discharge via silicon controlled rectifier Q3. As a result, trigger diode ZD1 remains conductive for a long time period, allowing a current to continuously charge capacitor C5 via resistor R7 (i.e., a self-test fault signal is generated) until the voltage across capacitor C5 rises to a certain level, sufficient to trigger silicon controlled rectifiers Q1 and Q2 to conduct. At this time, if the drive module 106 functions normally, then silicon controlled rectifiers Q1 and/or Q2 become conductive; as a result, a current flows through the solenoid SOL, generating a sufficiently large electromagnetic force to drive the reset switch RESET of the switch module 103 to disconnect the electrical connection between the input and output ends. But if the drive module 106 also malfunctions, e.g. the solenoid SOL is an open circuit, then the light emitting diode LED1 stops emitting light, indicating a self-test fault condition.

Additionally, the GFCI device 200 can test the zero sequence current detection function, i.e., to test whether the zero sequence current transformer CT1 can detect the ground fault signal and the leakage current signal. When performing the test, the reset switch RESET is closed. The user manually closes the test switch TEST of the monitor module 108, forming a current path from the first current carrying line 11 via resistor R6 to the second current carrying line 12 to generate a simulated leakage current. The zero sequence current transformer CT1 detects this simulated leakage current and generates a corresponding induction signal, and transfers it to the leakage current detection chip U1. When the simulated leakage current is larger than a preset threshold, pin 5 of leakage current detection chip U1 outputs a high voltage level, triggering silicon controlled rectifiers Q1 and/or Q2 to become conductive. As a result, a current flows through the solenoid SOL, generating a sufficiently large electromagnetic force to drive the reset switch RESET of the switch module 103 to disconnect the electrical connection between the input and output ends. On the other hand, if in response to the test switch TEST being closed, the reset switch RESET does not disconnect the electrical connection between the input and output ends, then it indicates that the zero sequence current detection and protection function of the GFCI device 200 is lost. By using the monitor module 108 to perform the test, malfunction in the leakage current detection and interruption device 200 can be discovered, reminding the user to replace the device.

Figure 3:
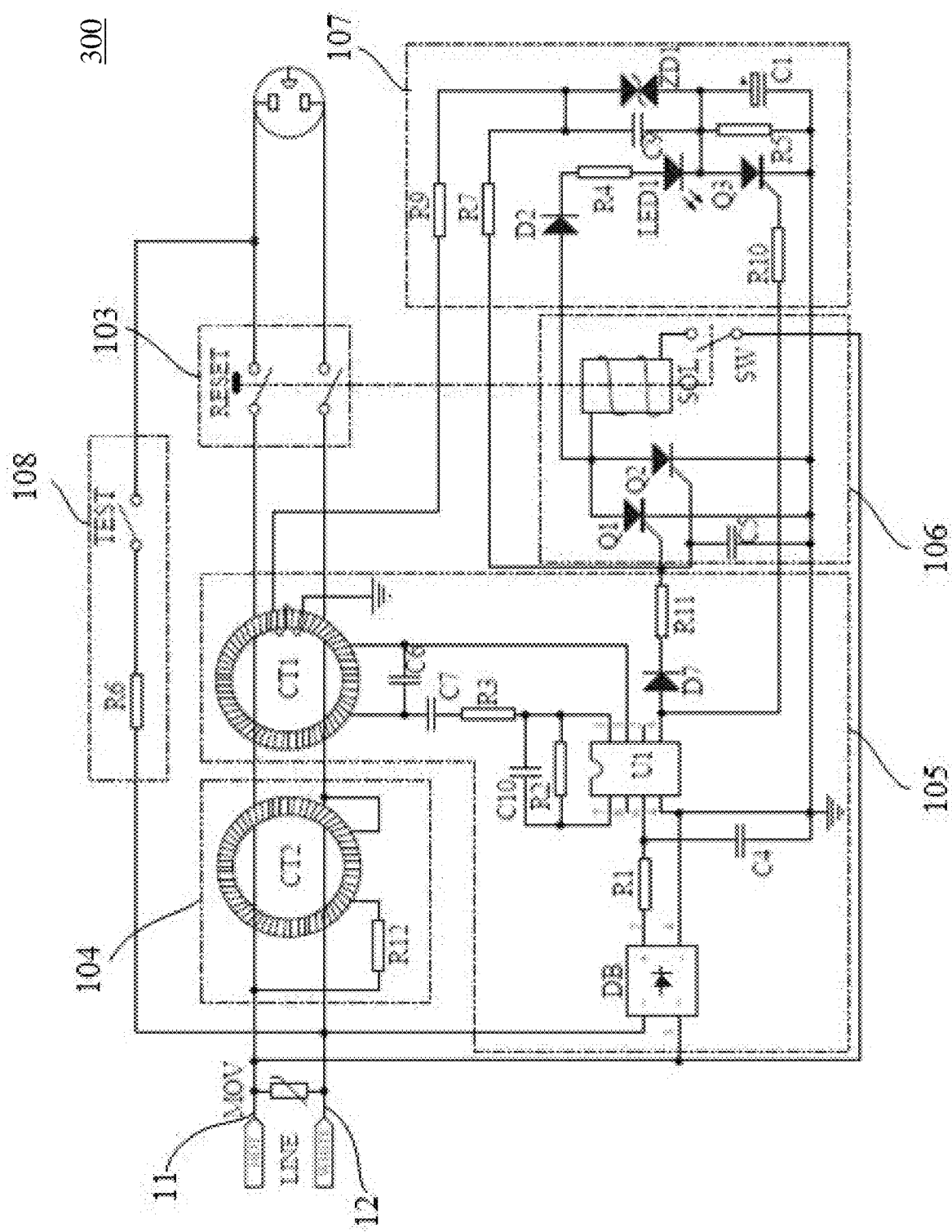
FIG. 3 is a circuit diagram of a ground fault circuit interrupter device according to a second embodiment of the present invention.

FIG. 3 is a circuit diagram of a leakage current detection and interruption device 300 according to a second embodiment of the present invention. Compared to the embodiment in FIG. 2, a main difference is that in the embodiment of FIG. 3, a resistor R12 replaces capacitor C2, and the neutral line detection coil CT2 is coupled at one end to the first current carrying line 11 via resistor R12, and coupled to the second current carrying line 12 at the other end. The neutral line ground fault protection function, leakage current protection function, self-test function, and test function are similar to those of the embodiment of FIG. 2 and further descriptions are omitted.

Figure 4:
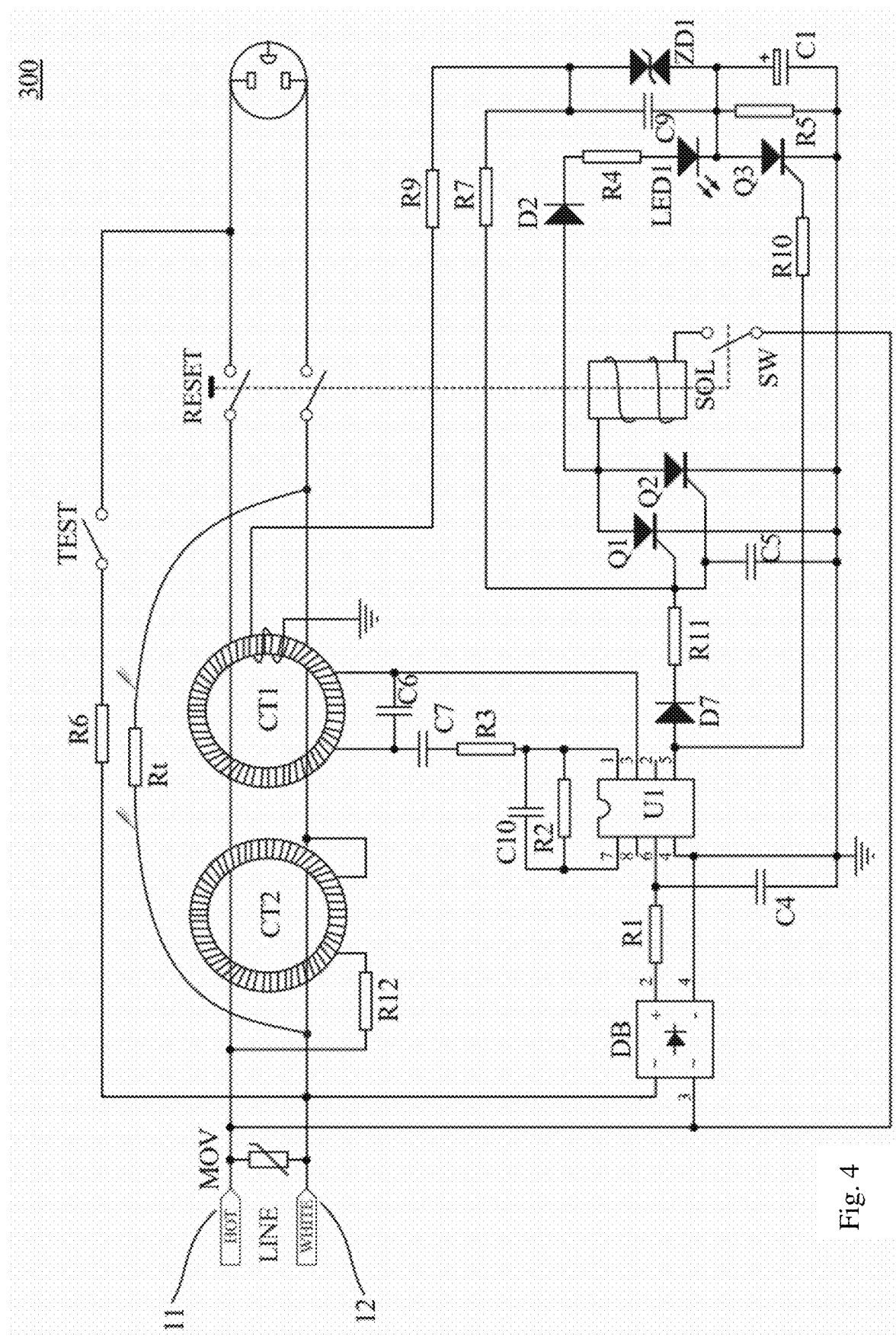
FIG. 4 illustrates simulation of a ground fault on the neutral line in the embodiment of FIG. 3.
Figure 5:
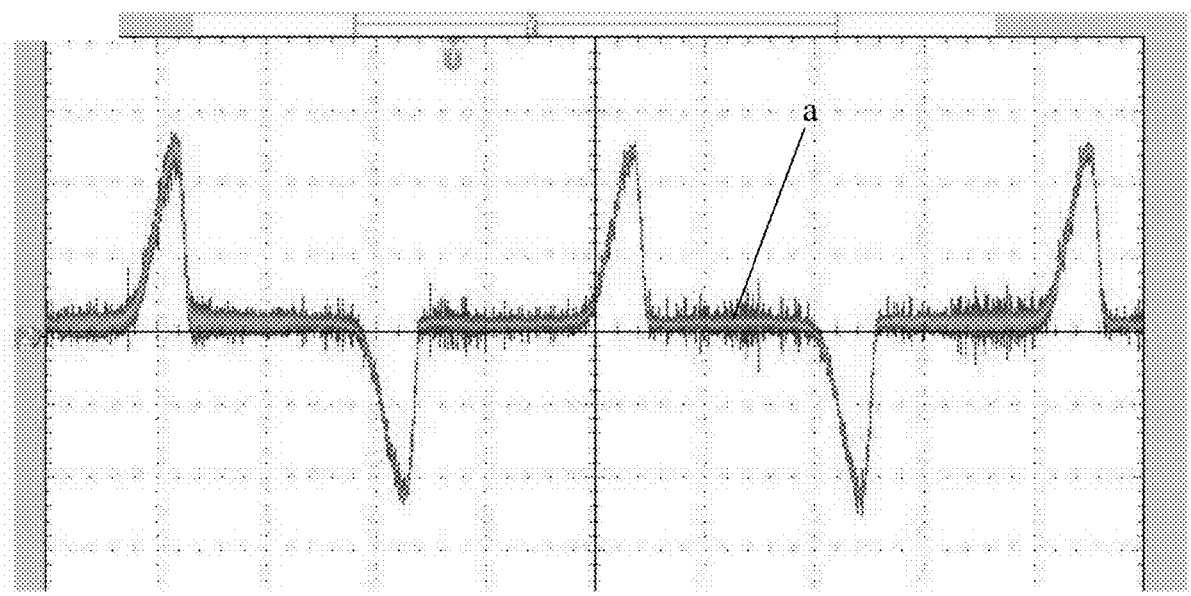
FIG. 5 shows the voltage waveform across resistor Rt in the circuit of FIG. 4.

FIG. 4 illustrates simulation of a ground fault on the neutral line in the embodiment of FIG. 3. FIG. 5 shows the voltage waveform across resistor Rt in the circuit of FIG. 4. As shown in FIG. 4, a resistor Rt is coupled between the input and output ends of the second current carrying line 12, to simulate an equivalent impedance to ground Rg when a neutral line ground fault occurs in the GFCI device 200 while in use. The resistance of resistor Rt is 2 ohms. An oscilloscope is coupled at the two ends of resistor Rt, to measure a voltage waveform shown in FIG. 5. It can be seen from FIG. 5 that when the second current carrying line 12 (the neutral line) has a ground fault, an alternating voltage is generated between the two ends of resistor Rt, with a maximum peak value of 55.6 mV, indicating that an alternating current (ground fault signal) is generated in the current loop input end of second current carrying line 12-output end of second current carrying line 12-equivalent impedance to ground Rg-input end of second current carrying line 12. In the voltage waveform, each period includes a flat-shoulder segment a (where the waveform is substantially flat) that lasts no less than 1/10 of the period.

Figure 6:
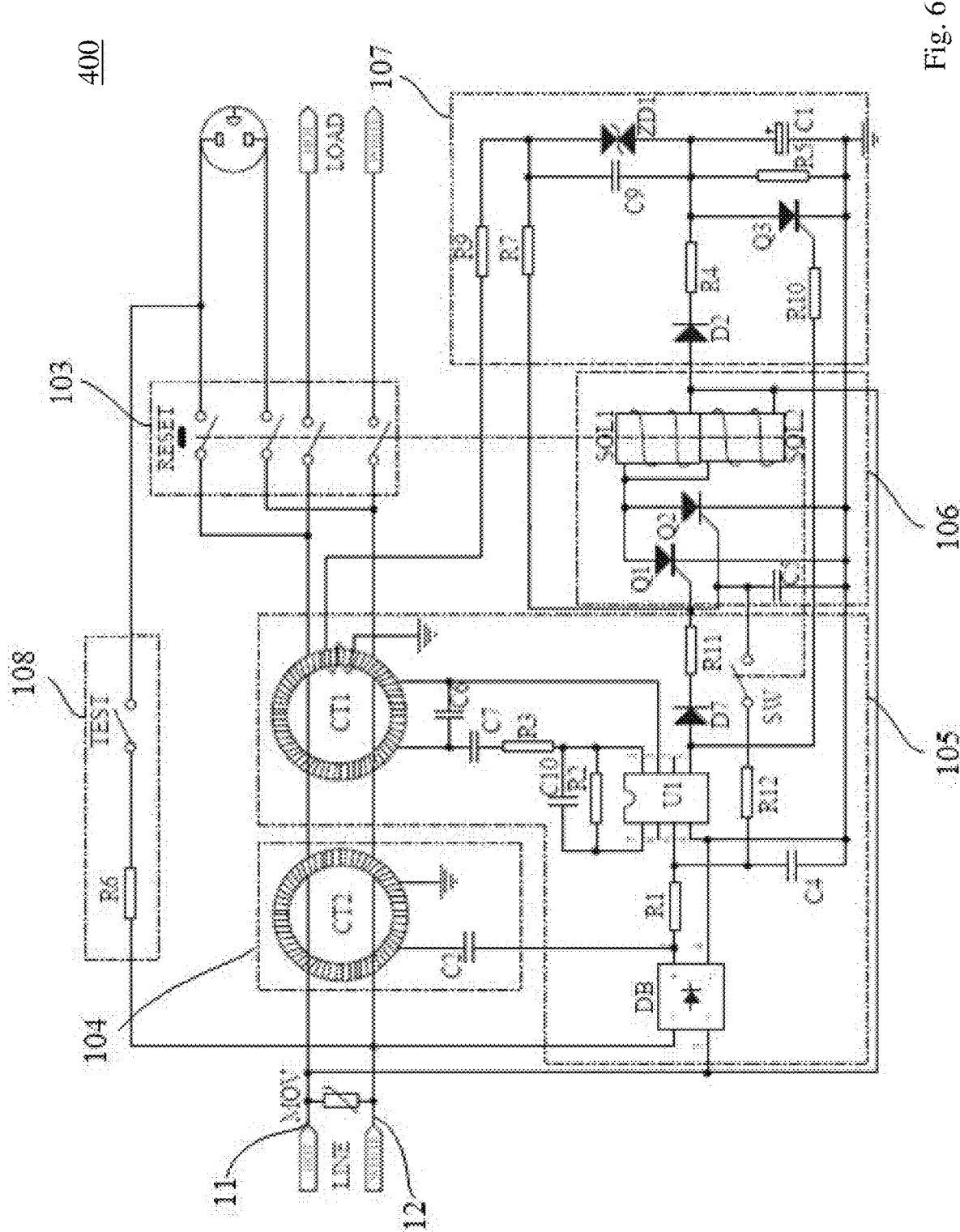
FIG. 6 is a circuit diagram of a ground fault circuit interrupter device according to a third embodiment of the present invention.

FIG. 6 is a circuit diagram of a leakage current detection and interruption device 400 according to a third embodiment of the present invention. Compared to the embodiment of FIG. 2, the main differences are in the ground fault detection module 104 and drive module 106. The drive module 106 of the GFCI device 400 uses two redundant solenoids SOL1 and SOL2. When one of the two solenoids malfunctions, the other one can still function normally, which extends the life of the GFCI device 400.

In the embodiment of FIG. 6, the ground fault detection module 104 includes a neutral line detection coil CT2 and a capacitor C2 coupled in series, where the first current carrying line 11 and the second current carrying line 12 pass through the neutral line detection coil CT2. The neutral line detection coil CT2 has a magnetic core made of silicon steel. More specifically, the magnetic core is formed of a wound silicon steel band, or a stack of multiple silicon steel plates. The winding of the neutral line detection coil CT2 has at least 500 turns. The neutral line detection coil CT2 is coupled at one end to the first current carrying line 11 and the second current carrying line 12 via capacitor C2 and diode bridge DB of the leakage current detection module 105, and coupled at the other end to ground.

The GFCI device 400 has a neutral line ground fault protection function. When the GFCI device 400 is connected to the load and connected to the power source, a current flows through DB-C2-CT2 and generates an alternating current on the neutral line detection coil CT2, so that the neutral line detection coil CT2 generates an alternating magnetic field. When the second current carrying line 12 (the neutral line) has a ground fault, a current loop is formed from ground (the grounding point of the second current carrying line 12 at its input end) via the input end of the second current carrying line 12 (left end in FIG. 6), the output end of the second current carrying line 12 (right end in FIG. 6), equivalent impedance to ground Rg, and back to ground (the grounding point of the second current carrying line 12 at its input end). Because the second current carrying line 12 passes through the neutral line detection coil CT2, it is disposed in the alternating magnetic field, so when the second current carrying line 12 (the neutral line) has a ground fault, a simulated alternating current (the ground fault signal) is generated in the current loop from ground (the grounding point of the second current carrying line 12 at its input end)-input end of second current carrying line 12-output end of second current carrying line 12-equivalent impedance to ground Rg-ground (the grounding point of the second current carrying line 12 at its input end); i.e., the simulated alternating current flows through the second current carrying line 12.

At this time, the zero sequence current transformer CT1 detects the simulated alternating current, and generates a corresponding induction signal at its secondary winding. The zero sequence current transformer CT1 is coupled to the leakage current detection chip U1 to transfer the induction signal to the leakage current detection chip U1 for processing. When the processed leakage current signal is higher than a preset threshold, pin 5 of the leakage current detection chip U1 outputs a high voltage level (the zero sequence current fault signal); otherwise, it outputs a low voltage signal. The high voltage level at pin 5 of leakage current detection chip U1 is provided via diode D7 and resistor R11 to the control electrodes of silicon controlled rectifier Q1 and Q2, triggering silicon controlled rectifier Q1 and/or Q2 to become conductive. As a result, a current flows through the solenoids SOL1 and/or SOL2, generating a sufficiently large electromagnetic force to drive the reset switch RESET of the switch module 103 to disconnect the electrical connection between the input and output ends, and to open the auxiliary switch SW at the same time.

The GFCI device 400 also has a leakage current protection function. When a leakage current is present on the first current carrying line 11 or the second current carrying line 12, the zero sequence current transformer CT1 detects the leakage current and generates a corresponding induction signal at its secondary winding. The zero sequence current transformer CT1 is coupled to the leakage current detection chip U1 to transfer the induction signal to the leakage current detection chip U1 for processing. When the processed leakage current signal is higher than a preset threshold, pin 5 of the leakage current detection chip U1 outputs a high voltage level (the zero sequence current fault signal); otherwise, it outputs a low voltage signal. The high voltage level at pin 5 is provided via diode D7 and resistor R11 to the control electrodes of silicon controlled rectifier Q1 and Q2, triggering silicon controlled rectifier Q1 and/or Q2 to become conductive. As a result, a current flows through the solenoids SOL1 and/or SOL2, generating a sufficiently large electromagnetic force to drive the reset switch RESET of the switch module 103 to disconnect the electrical connection between the input and output ends, and to open the auxiliary switch SW at the same time.

The GFCI device 400 has a self-test function. A current from the first current carrying line 11 charges capacitor C1 via the current path 11-D2-R4. As the voltage across capacitor C1 rises, the voltage across the trigger diode ZD1 rises with it. After a predetermined time period, the voltage across the trigger diode ZD1 reaches its trigger voltage, triggering it to become conductive. As a result, a current flows through the path C1-ZD1-R9 to generate a simulated leakage current. The voltage on capacitor C1 also charges capacitor C5 via resistor R7.

When the GFCI device 400 functions normally, i.e., both the leakage current detection module 105 and drive module 106 function normally, when the zero sequence current transformer CT1 detects the simulated leakage current, it generates a corresponding induction signal at its secondary winding and transfers the signal to the leakage current detection chip U1, causing leakage current detection chip U1 to output a high voltage level at pin 5, triggering silicon controlled rectifier Q3 to become conductive. At this time, capacitor C1 is rapidly discharged via silicon controlled rectifier Q3, and the voltage across it drops rapidly. When the voltage drops to below the trigger voltage of the trigger diode ZD1, the trigger diode ZD1 turns off. The time period of this process is relatively short, so the voltage across capacitor C5 rises slowly during this time period, and remains relatively low, such that it is insufficient to trigger silicon controlled rectifiers Q1 and Q2 to become conductive, so as not to affect the normal function of the GFCI device 400. Therefore, during this process switch module 103 does not trip (i.e., it remains closed).

When the leakage current detection module 105 malfunctions and cannot detect the simulated leakage current, pin 5 of leakage current detection chip U1 remains at the low voltage level. Therefore, silicon controlled rectifier Q3 is not triggered to conduct, so capacitor C1 cannot discharge via silicon controlled rectifier Q3. As a result, trigger diode ZD1 remains conductive for a long time period, allowing a current to continuously charge capacitor C5 via resistor R7 (i.e., a self-test fault signal is generated) until the voltage across capacitor C5 rises to a certain level, sufficient to trigger silicon controlled rectifiers Q1 and Q2 to conduct. At this time, if the drive module 106 functions normally, then silicon controlled rectifiers Q1 and/or Q2 become conductive; as a result, a current flows through the solenoids SOL1 and/or SOL2, generating a sufficiently large electromagnetic force to drive the reset switch RESET of the switch module 103 to disconnect the electrical connection between the input and output ends. But if both solenoids SOL1 and SOL2 are open circuit, then switch module 103 remains closed.

Additionally, the GFCI device 400 of FIG. 6 can test the zero sequence current detection function, i.e., to test whether the zero sequence current transformer CT1 can detect the ground fault signal and the leakage current signal. When performing the test, the reset switch RESET is closed. The user manually closes the test switch TEST of the monitor module 108, forming a current path 11-R6-12 to generate a simulated leakage current. The zero sequence current transformer CT1 detects this simulated leakage current and generates a corresponding induction signal, and transfers it to the leakage current detection chip U1. When the simulated leakage current is larger than a preset threshold, pin 5 of leakage current detection chip U1 outputs a high voltage level, triggering silicon controlled rectifiers Q1 and/or Q2 to become conductive. As a result, a current flows through the solenoids SOL1 and/or SOL2, generating a sufficiently large electromagnetic force to drive the reset switch RESET of the switch module 103 to disconnect the electrical connection between the input and output ends. On the other hand, if in response to the test switch TEST being closed, the reset switch RESET does not disconnect the electrical connection between the input and output ends, then it indicates that the zero sequence current detection and protection function of the GFCI device 400 is lost. By using the monitor module 108 to perform the test, malfunction in the leakage current detection and interruption device 400 can be discovered, reminding the user to replace the device.

Figure 7:
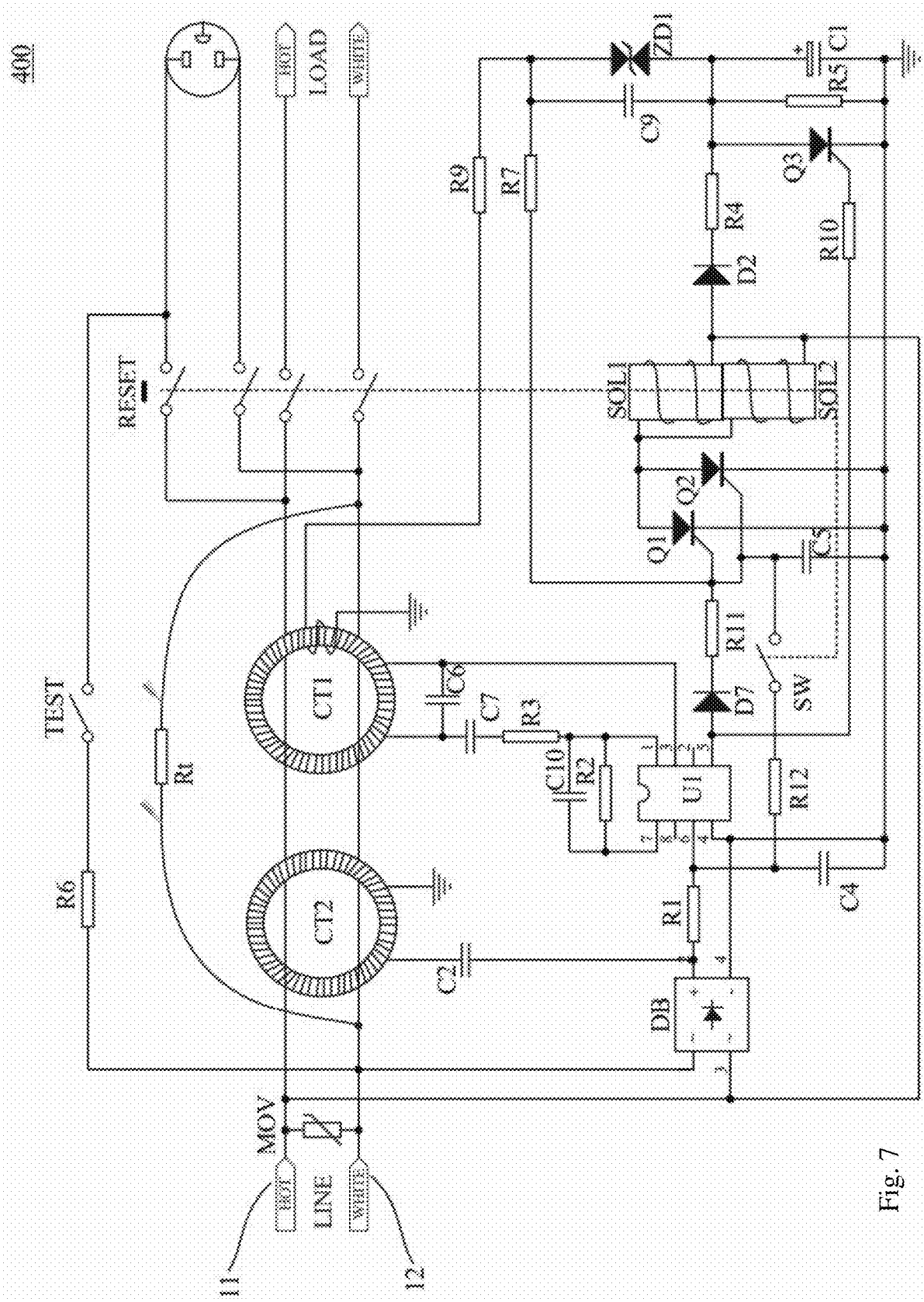
FIG. 7 illustrates simulation of a ground fault on the neutral line in the embodiment of FIG. 6.
Figure 8:
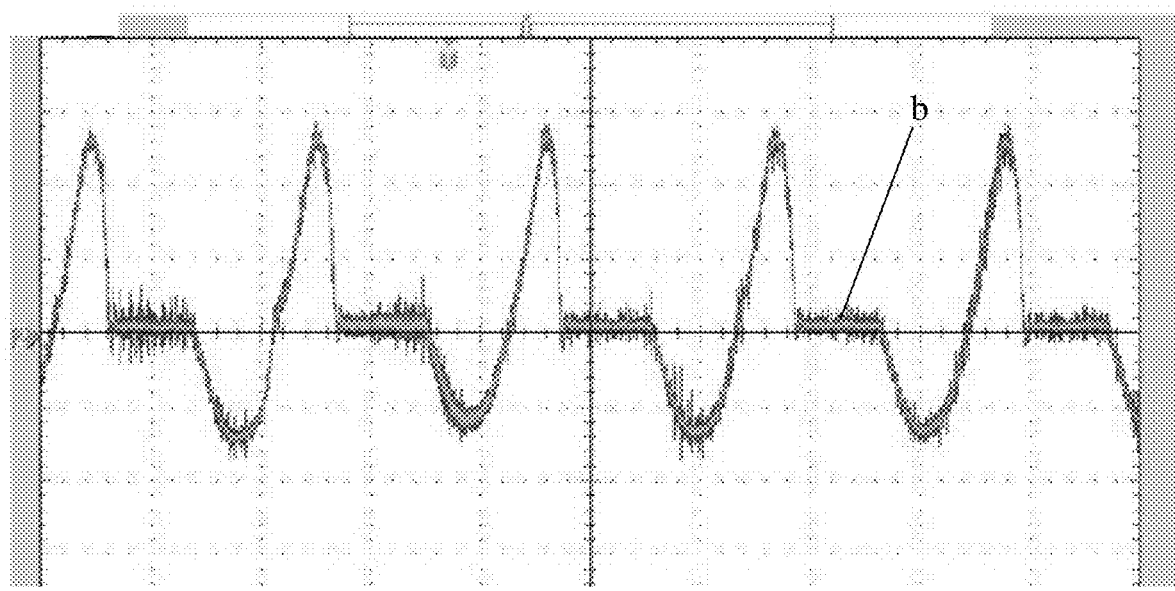
FIG. 8 shows the voltage waveform across resistor Rt in the circuit of FIG. 7.
Figure 8A:
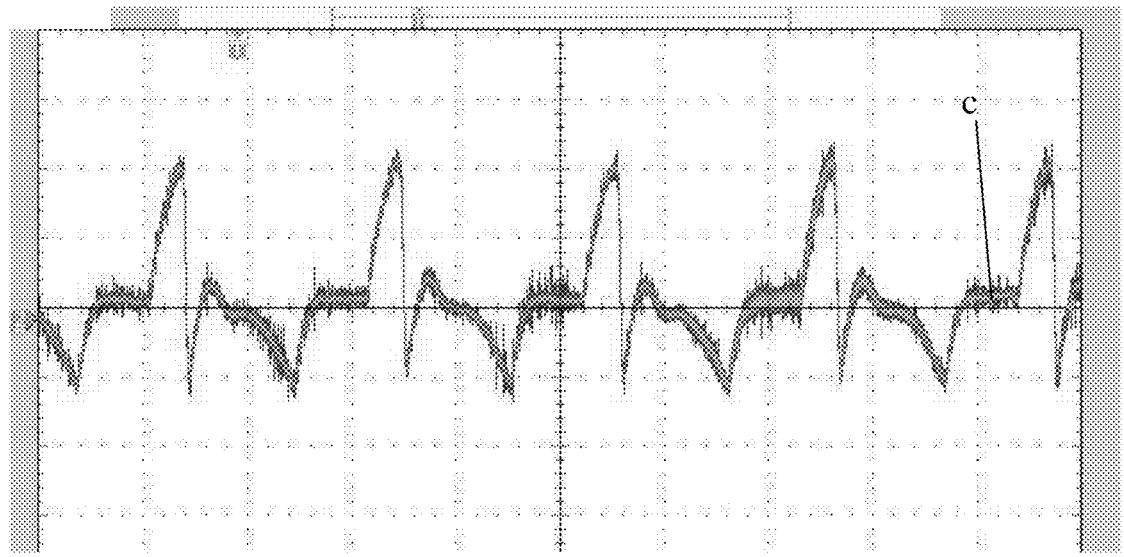
FIG. 8A shows another voltage waveform across resistor Rt in the circuit of FIG. 7 with a different value of certain circuit element.

FIG. 7 illustrates simulation of a ground fault on the neutral line in the embodiment of FIG. 6. FIG. 8 shows the voltage waveform across resistor Rt in the circuit of FIG. 7. As shown in FIG. 7, a resistor Rt is coupled between the input and output ends of the second current carrying line 12, to simulate an equivalent impedance to ground Rg when a neutral line ground fault occurs in the GFCI device 400 while in use. The resistance of resistor Rt is 2 ohms. An oscilloscope is coupled at the two ends of resistor Rt, to measure a voltage waveform shown in FIG. 8. It can be seen from FIG. 8 that when the second current carrying line 12 (the neutral line) has a ground fault, an alternating voltage is generated between the two ends of resistor Rt, with a maximum peak value of 58.9 mV, indicating that an alternating current (ground fault signal) is generated in the current loop input end of second current carrying line 12-output end of second current carrying line 12-equivalent impedance to ground Rg-input end of second current carrying line 12. In the voltage waveform, each period includes a flat-shoulder segment b that lasts no less than $1/10$ of the period. When the capacitance value of capacitor C2 in FIG. 6 is changed, the voltage waveform across Rt changes somewhat. FIG. 8A shows the voltage waveform across resistor Rt corresponding to a different C2 capacitance value. It has a maximum peak value of 50.4 mV, and each period includes a flat-shoulder segment c that lasts no less than $1/10$ of the period.

Figure 9:
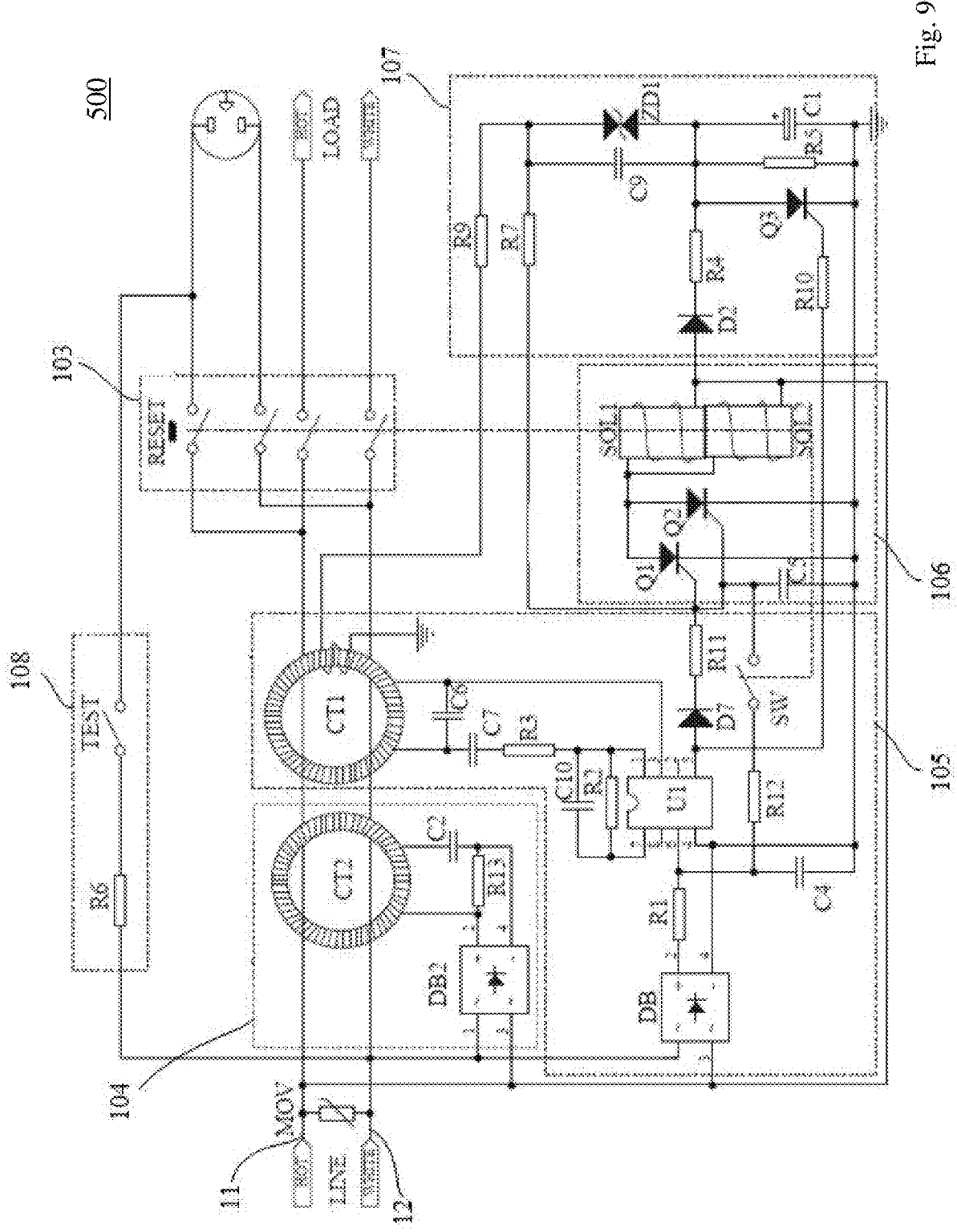
FIG. 9 is a circuit diagram of a ground fault circuit interrupter device according to a fourth embodiment of the present invention.

FIG. 9 is a circuit diagram of a leakage current detection and interruption device 500 according to a fourth embodiment of the present invention. Compared to the embodiment of FIG. 6, one difference is in the ground fault detection module 104. The leakage current protection function, self-test function and the test function of the embodiment of FIG. 9 are similar to those of the embodiment of FIG. 2 and further descriptions are omitted.

In the embodiment of FIG. 9, the ground fault detection module 104 further includes a rectifier bridge DB2. The neutral line detection coil CT2 is coupled at one end to rectifier bridge DB2, and coupled at the other end to rectifier bridge DB2 via capacitor C2, so as to be coupled to the first current carrying line 11 and the second current carrying line 12 via rectifier bridge DB2.

When the GFCI device 500 is connected to the load and connected to the power source, a current flows through DB2-C2-CT2 and generates an alternating current on the neutral line detection coil CT2, so that the neutral line detection coil CT2 generates an alternating magnetic field.

When the second current carrying line 12 (the neutral line) has a ground fault, a current loop is formed from ground via the input end of second current carrying line 12 (left end in FIG. 9), the output end of the second current carrying line 12 (right end in FIG. 9), equivalent impedance to ground Rg, and back to ground. Because the second current carrying line 12 passes through the neutral line detection coil CT2, it is disposed in the alternating magnetic field, so when the second current carrying line 12 (the neutral line) has a ground fault, a simulated alternating current (the ground fault signal) is generated in the current loop from ground-input end of second current carrying line 12-output end of second current carrying line 12-equivalent impedance to ground Rg-ground; i.e., the simulated alternating current flows through the second current carrying line 12.

At this time, the zero sequence current transformer CT1 detects the simulated alternating current, and generates a corresponding induction signal at its secondary winding. The zero sequence current transformer CT1 is coupled to the leakage current detection chip U1 to transfer the induction signal to the leakage current detection chip U1 for processing. When the processed leakage current signal is higher than a preset threshold, pin 5 of the leakage current detection chip U1 outputs a high voltage level (the zero sequence current fault signal); otherwise, it outputs a low voltage signal. The high voltage level at pin 5 of leakage current detection chip U1 is provided via diode D7 and resistor R11 to the control electrodes of silicon controlled rectifier Q1 and Q2, triggering silicon controlled rectifier Q1 and/or Q2 to become conductive. As a result, a current flows through the solenoids SOL1 and/or SOL2, generating a sufficiently large electromagnetic force to drive the reset switch RESET of the switch module 103 to disconnect the electrical connection between the input and output ends, and to open the auxiliary switch SW at the same time.

In a second aspect, the present invention provides an electrical power connection device, which includes a body and a ground fault circuit interrupter device according to any one of the above embodiments disposed inside the body.

In a third aspect, the present invention provides an electrical appliance, which includes an electrical load, and an electrical power connection device coupled between a power supply and the load to supply power to the load, where the electrical power connection device employs a ground fault circuit interrupter device according to any one of the above embodiments.

While the present invention is described above using specific examples, these examples are only illustrative and do not limit the scope of the invention. It will be apparent to those skilled in the art that various modifications, additions and deletions can be made to the ground fault circuit interrupter device of the present invention without departing from the spirit or scope of the invention.

The invention claimed is:

1. A ground fault circuit interrupter device comprising:
  a plurality of current carrying lines having an input end and an output end, including a neutral line;
  a switch module, coupled on the plurality of current carrying lines between the input end and the output end, configured to connect or disconnect an electrical connection between the input end and the output end;
  a ground fault detection module, including at least one neutral line detection coil through which the plurality of current carrying lines pass, wherein the at least one neutral line detection coil has a magnetic core made of a silicon steel material, and wherein the ground fault detection module is configured to detect a ground fault in the neutral line and to generate a ground fault signal in response thereto, wherein when a simulated grounding resistance of the neutral line Rt is 2 ohms, a peak value of a voltage waveform generated by the ground fault signal on the simulated grounding resistance is greater than or equal to 16 mV and each period of the voltage waveform includes a flat-shoulder segment that lasts no less than $\frac{1}{10}$ of the period;

a leakage current detection module, coupled to the current carrying lines, configured to detect the ground fault signal and to detect a leakage current signal on the current carrying lines, and to generate a zero sequence current fault signal in response to detecting the ground fault signal and/or the leakage current signal; and a drive module, coupled to the switch module and the leakage current detection module, configured to receive the zero sequence current fault signal, and to drive the switch module to disconnect the electrical connection in response to the zero sequence current fault signal.

2. The device of claim 1, wherein the ground fault detection module includes at least one current limiting element, coupled in series with the at least one neutral line detection coil and coupled to the current carrying lines, configured to generate an alternating current on the at least one neutral line detection coil which in turn generates an alternative magnetic field, wherein when the neutral line has a ground fault, under actions of the alternating magnetic field, the ground fault signal is generated on the neutral line.

3. The device of claim 2, wherein the at least one current limiting element is one or more of a resistor, a capacitor, or an inductor.

4. The device of claim 1, wherein the at least one neutral line detection coil is coupled to the plurality of current carrying lines via a rectifier module.

5. The device of claim 1, wherein the magnetic core of the at least one neutral line detection coil is formed of a wound silicon steel band, or a stack of multiple silicon steel plates.

6. The device of claim 1, wherein a winding of the at least one neutral line detection coil has at least 500 turns.

7. The device of claim 1, further comprising a self-test module coupled to the leakage current detection module and the drive module, configured to periodically generate a simulated leakage current signal to detect whether the leakage current detection module and/or the drive module is malfunctioning, and when the leakage current detection module and/or the drive module malfunctions, to generate a self-test fault signal.

8. The device of claim 7, wherein the self-test module includes a voltage-triggered sub-module and a first capacitor coupled in series, wherein the first capacitor is charged by the plurality of current carrying lines and configured to periodically generate the simulated leakage current signal via the voltage-triggered sub-module.

9. The device of claim 8, wherein the voltage-triggered sub-module includes a trigger diode, a transistor, a field-effect transistor, and/or a comparator.

10. The device of claim 1, further comprising:

a monitor module, coupled to the leakage current detection module and includes a test switch, wherein the monitor module is configured to generate a simulated leakage current signal in response to the test switch being operated, to detect whether the ground fault circuit interrupter device is functioning normally.

11. An electrical power connection device, comprising: a body; and the ground fault circuit interrupter device of claim 1, disposed inside the body.

12. An electrical appliance, comprising: an electrical load; and an electrical power connection device coupled between a power supply and the electrical load, configured to supply power to the electrical load, wherein the electrical power connection device includes the ground fault circuit interrupter device of claim 1.

* * * * *